April 16, 1963  F. V. PIXLEY  3,085,671
CONVEYOR AND CONVEYOR SYSTEM
Filed Dec. 27, 1961  3 Sheets-Sheet 1
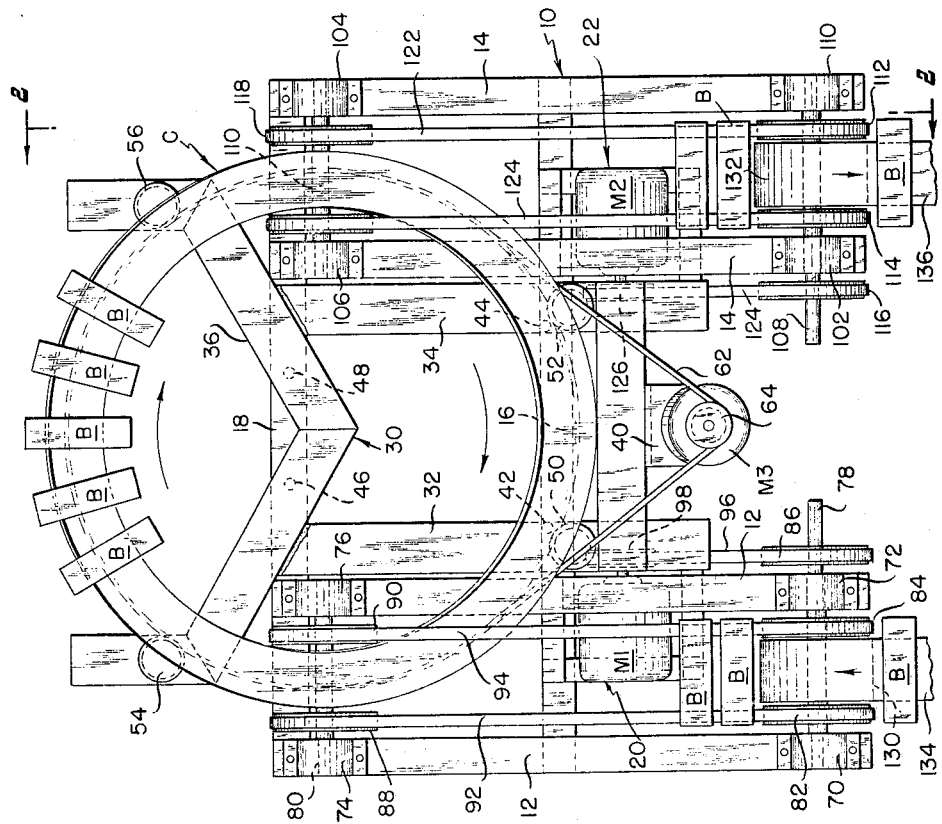
INVENTOR
Francis V. Pixley
BY *Shlesinger + Shlesinger*
ATTORNEYS

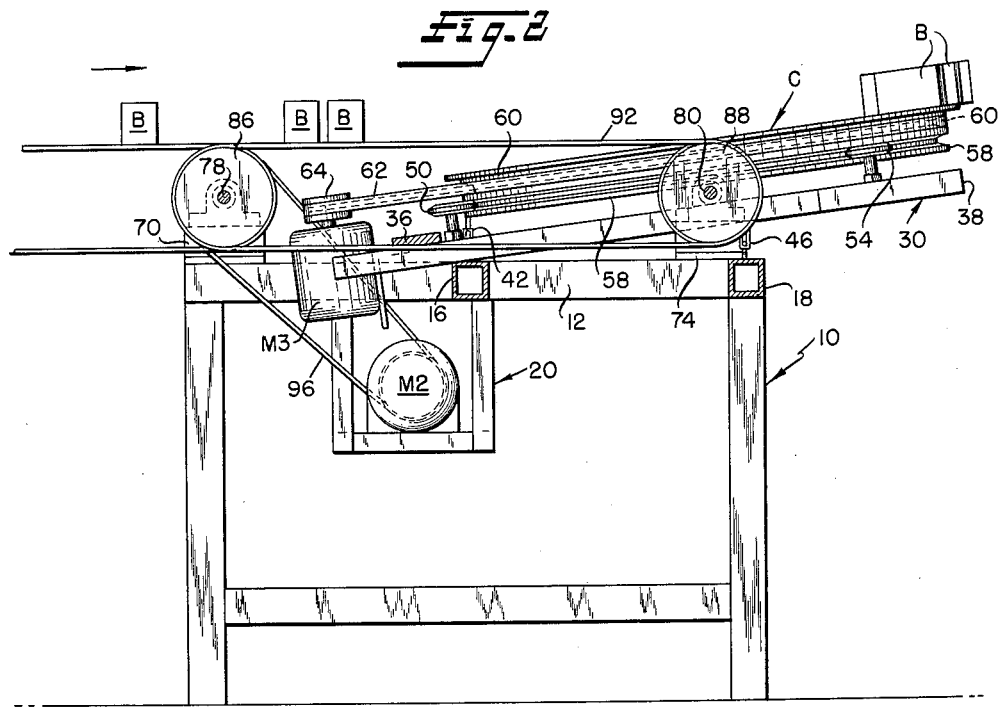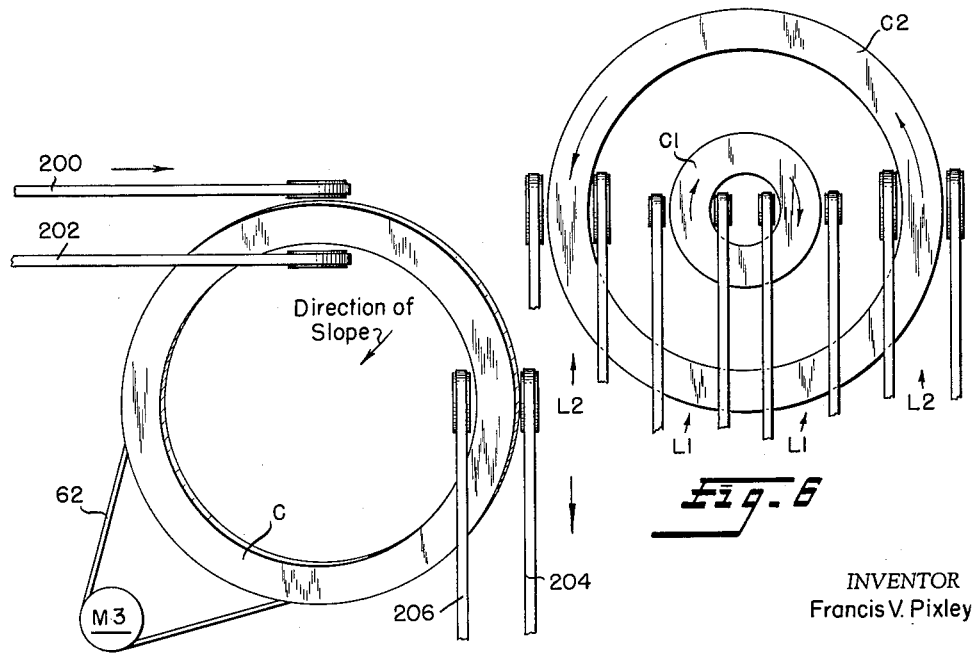

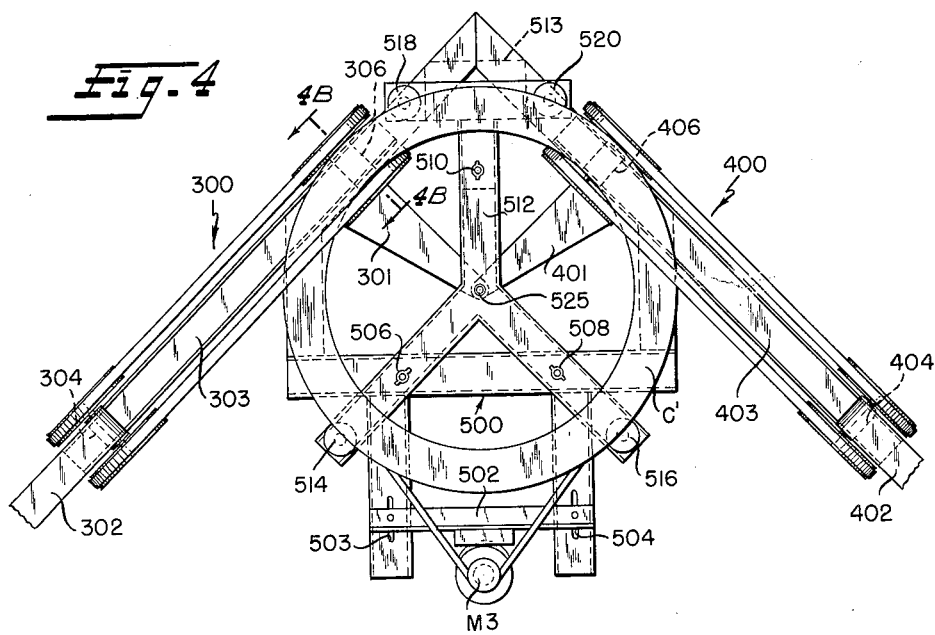
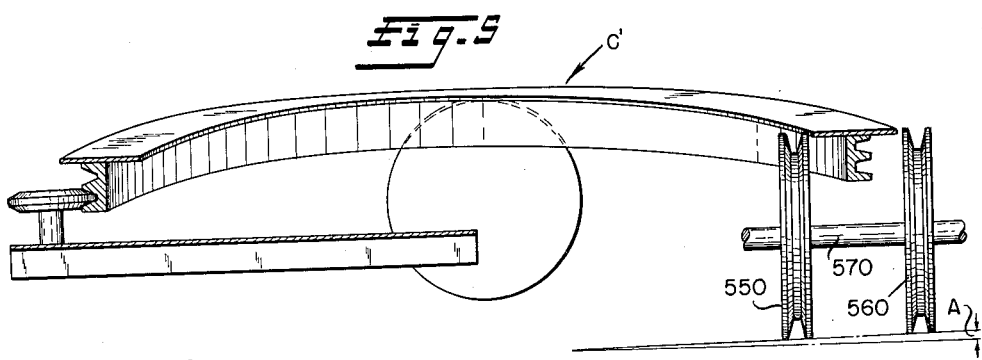
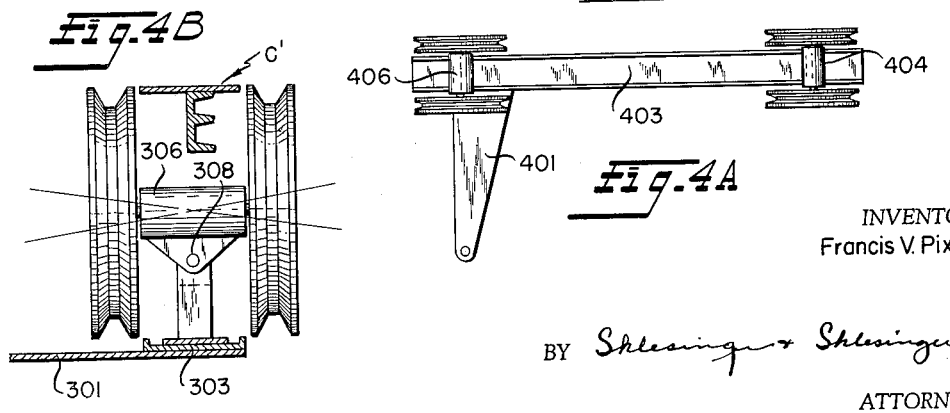

United States Patent Office 3,085,671
Patented Apr. 16, 1963

3,085,671
CONVEYOR AND CONVEYOR SYSTEM
Francis V. Pixley, 9 Flamingo Drive, Newburgh, N.Y.
Filed Dec. 27, 1961, Ser. No. 162,349
18 Claims. (Cl. 198—20)

This invention relates to improvements in conveyors and particularly in conveyor systems which require apparatus for changing the direction of travel of the material in the system.

In the past, where it has been necessary for material to be transported in a conveyor system around a corner or the like, a transition or intermediate conveyor has been used to negotiate the turn to change the direction of travel of the material coming in one direction in order to enable it to proceed in another direction. There have been a number of circular conveyors designed to pick up material from one conveyor and move it about the circle to another conveyor travelling in a different direction. The principal problem in performing the transition has been the elimination of shock to an article which is being transferred to or from the intermediate conveyor. The shock has been primarily due to a drop onto the intermediate conveyor or damage done to the article where a pusher is necessary to transfer the article to or from the intermediate conveyor.

In the case of articles which are fragile and easily deformed, the transfer by the use of present known procedures has resulted in considerable damage to the article. In negotiating a turn, one article may be banged against the other on the intermediate conveyor, or against the pusher, or may be deformed when leaving the principle conveyor when dropped onto the intermediate conveyor.

It is an object of this invention to provide a conveyor which will handle very delicate, frangible or easily deformable articles. This invention is particularly applicable to the brick making, pottery making, and ceramics industries where the green clay objects such as green brick, are easily deformed by shock or contact.

Another object of this invention is to provide an intermediate conveyor which will eliminate all shock to the articles being transferred and maintain them in proper spaced relation at all times to prevent them from damaging one another.

A further object of this invention is to provide a conveyor and conveyor system which will enable the articles being transferred to travel around corners without damage thereto.

Still another object of this invention is to provide a conveyor which is simple in construction and readily adaptable to various types of standard conveyor systems.

Yet another object of this invention is to provide a conveyor and conveyor system which is adjustable and adaptable to various angular turns depending upon the situation in which it is to be used.

A further object of this invention is to provide a conveyor which can be operated at high speeds without damage to the articles being carried thereby.

Yet another object of this invention is to provide a conveyor which is readily manufactured, easily transported, and inexpensive to construct and maintain.

A still further object of this invention is to provide a conveyor and conveyor system which can be designed to carry large as well as small articles thereon.

These and other objects and advantages of this invention will be apparent from the following description and claims.

In the accompanying drawings which illustrate by way of example various embodiments of this invention:

FIGURE 1 is a top plan view of this invention showing the intermediate conveyor system operating in conjunction with the primary conveyors which are shown only fragmentarily;

FIGURE 2 is a side elevation of a section of FIGURE 1 taken along the lines 2—2 of FIGURE 1 and viewed in the direction of the arrows;

FIGURE 3 is a schematic illustrating one embodiment of this invention which permits transfer of articles in a direction of 90°;

FIGURE 4 is a top plan view of another embodiment of this invention showing the adjustable feature;

FIGURE 4A is a top plan view of a portion of the conveyor system shown in FIGURE 4;

FIGURE 4B is an enlarged fragmentary view of a portion of the conveyor taken along the lines 4B—4B of FIGURE 4 and viewed in the direction of the arrows;

FIGURE 5 is an enlarged fragmentary view showing the tilt in the plane of the circular conveyor with respect to the horizontal;

FIGURE 6 is a schematic of another embodiment of this invention showing two conveyor systems simultaneously in operation.

In FIGURES 1 and 2, the conveyor system is shown mounted on a table or platform 10. The table 10 may be mounted on casters (not shown) if ready movement thereof is desired. The table 10 is comprised of longitudinal members 12 and 14 and transverse support members 16 and 18. The table 10 has motor supporting brackets 20 and 22 which support motors M1 and M2.

A circular ring shaped conveyor generally indicated by C is mounted on an adjustable platform or table 30. Platform 30 comprises two leg members 32 and 34 which support a transverse C-member 36. A member 38 is provided with a motor mounting bracket 40 for motor M3. The conveyor support table 30 is supported on transverse members 16 and 18 for adjustment by turn buckles 42, 44, 46 and 48. Mounted on table 30 are four roller guide members 50, 52, 54 and 56. The guide rollers 50, 52, 54 and 56 carry the circular conveyor C. The circular conveyor C is provided with spaced annular grooves 58 and 60 best shown in FIGURE 2. Guide rollers 50, 52, 54 and 56 travel in annular groove 58. A pulley belt 62 is driven through a drive pulley 64 on motor M3. Pulley 62 travels in annular groove 60 of the conveyor C. It is obvious that table 30 and conveyor C mounted thereon, will be vertically as well as tiltably adjusted through the turn buckles 42, 44, 46 and 48.

Support members 12 have mounted thereon bearing blocks 70, 72, 74 and 76. Pulley shafts 78 and 80 are supported in the bearing blocks 70 and 72, and 74 and 76 respectively. Pulley shafts 78 and 80 support pulleys 82, 84, 86, 88 and 90. Conveyor belts 92 and 94 are carried by pulleys 82 and 88, and 84 and 90 respectively. The belts 92 and 94 are driven from motor M1 through a drive belt 96 which connects motor pulley 98 with the conveyor belt driving pulley 86.

A similar arrangement of conveyor belts and pulleys is mounted on the other side of the table 10. Pulley bearing blocks 100, 102, 104 and 106 support pulley shafts 108 and 110 respectively. Shafts 108 and 110 support pulleys 112, 114, 116, 118 and 120. Conveyor belt 122 is carried by pulleys 112, and 118 and conveyor belt 124 is carried by pulleys 114 and 120. Conveyor belts 122 and 124 are driven by means of motor M2 through a drive belt 124 connecting motor pulley 126 with the conveyor driving pulley 116.

Pulley shafts 78 and 108 carry primary conveyor pulleys 130 and 132 best shown in FIGURE 1. Conveyor belts 134 and 136 are supported on pulleys 130 and 132 respectively.

*Operation of the Construction Shown in FIGURES 1 and 2*

In the operation of the invention illustrated in FIGURES 1 and 2, the green bricks B are supplied from the principle conveyor 134 to the intermediate conveyor system which includes conveyor belts 92 and 94. The principle conveyor 134 may be driven off the motor M1 by splining the pulley 130 to the shaft 78. The motor M1 drives belts 92 and 94 at the same speed as belt 134. The transfer of the bricks B from belt 134 to belts 92 and 94 is done without any lost motion or jarring to the fragile and delicate green bricks B. It is to be noted that belt 94 passes over the circular conveyor C and then around pulley 90 to return beneath the circular conveyor C. Conveyor 92 running parallel to conveyor 94 is outside of the circular conveyor. The two conveyors 92 and 94 are parallel and coextensive with one another. In order to permit belt 94 from interfering with the circular conveyor C, the conveyor table 30 in which the circular conveyor C is mounted, is inclined to the horizontal. The circular conveyor C is driven by a motor M3 through the belt 62 and travels at the same speed as conveyors 92 and 94. Since the plane of travel of conveyors 92 and 94 intersects at an angle the plane of the conveyor C, the transition of the brick B from the conveyors 92 and 94 onto the circular conveyor C is done without any drop or jar to the objects being transferred. The slight vertical force component which might be exerted against the brick due to the change of travel from the horizontal to the slight incline of the conveyor C is quite negligible even at relatively high speeds if the transfer angle is slight. It is obvious that the tilt of the table 30 may be so great as to prevent the circular conveyor C from holding objects thereon unless they are supported by some type of guide rail or bead on the inside of the conveyor or on the outside where centrifugal force is liable to throw the objects outwardly. The beads are not shown in the drawings but can be positioned so as to prevent skidding of certain types of objects which might be carried by the conveyor particularly if they are of a type which might roll off of the planar surface of the conveyor C.

Once the circular conveyor C has received the brick B from the conveyors 92 and 94, the brick is moved in an arc of 180° and is picked up by conveyors 120 and 122 which are positioned in a manner similar to conveyors 92 and 94. The conveyors 120 and 122 then transfer the brick to the primary delivery conveyor 136. The whole transition of the brick B through the turn of 180° is done without any damage to the brick itself. It is to be noted that in a case of soft objects which are easily dented or deformed, the circular conveyor C keeps the articles spaced one from the other because of the smooth transition onto the circular conveyor C. There is no pile up which in the case of green brick, can result in severe damage to the brick.

It is obvious that the motors M1, M2 and M3 will be timed to maintain all conveyors travelling at the same rate of speed. A single motor could be provided to handle all of the conveyors providing some type of transmission system is provided to keep the conveyor speeds constant and uniform.

It will be obvious, that the circular conveyor need not be restricted to size or width, so long as the central opening in the ring is sufficient to receive the inside conveyor belts. The actual table construction supporting the conveyor and conveyor system can be modified considerably depending upon the use to which the circular conveyor is to be put. Heavier materials will require a heavier system whereas, lighter materials such as eggs, ornaments, and the like do not require heavy equipment and even light plastics may be used so long as the conveyors themselves can adequately support the weight to be transported.

*Modifications*

FIGURE 3 illustrates another embodiment of this invention in which incoming conveyor belts 200 and 202 and the outgoing conveyor belts 204 and 206 are mounted at a right angle to each other. The circular conveyor C is driven by the pulley motor M3 and belt 62. It is to be noted, that the direction of the slope will always be along a line midway between the feed-in conveyors and the feed-out conveyors.

FIGURE 6 schematically shows how two circular ring conveyors C1 and C2 may be positioned one within the other in order to conserve space where two conveyor lines are being used in side-by-side relationship as for example conveyor lines L1 moving in a clockwise direction and conveyor lines L2 moving in a counterclockwise direction. Merely changing the motor drive would permit the conveyor lines to move in the same direction or in a direction contra to the direction heretofore just described.

The construction shown in FIGURES 4, 4A, 4B and 5 are illustrative of still another embodiment of this invention.

Conveyors 300 receive the material from conveyor 302 and transfer the material onto circular conveyor C' and thence to feed-off conveyor 400 which in turn delivers the material to primary receiver conveyor 402.

The conveyor C' is supported on a support frame 500 having a motor support bar 502 for the motor M3. It is to be noted that the motor support bar 502 is slidably adjustable in slots 503 and 504.

The frame 500 which is somewhat arrow shaped, mounts adjustment turn buckles 506, 508 and 510. The turn buckle 510 is supported on a plate 513 supported on frame 500. Supported by turn buckles 506, 508 and 510 is a Y frame member 512. The Y frame member 512 carries guide rollers 514, 516, 518 and 520.

Y member 512 carries a pair of pivoted arms 301 and 401 pivoted to Y frame 512 at 525. The arms 301 and 401 are of L shape configuration as best shown in FIGURE 5. A longitudinal member 303 on pivot arm 301 supports the bearings or journals 304 and 306 and longitudinal member 403 on arm 401 supports journals 404 and 406. The journal members 304 and 306, 404 and 406 are all pivotally supported by a pivot member similar to pivot member 308 shown in FIGURE 4B. The pivot member 308 may be such as to lock to journal 306 in the angled position desired. Any suitable locknut or clamp may be provided.

By pivoting members 301 and 401 conveyors 300 and 400 will be shifted angularly with respect to one another. This permits flexibility of the equipment since it provides for varying angle changes as desired to meet varying needs of industry.

FIGURE 5 illustrates the reason for providing the pivot 306 shown in FIGURE 4B. Because of the inclination of the circular conveyor C', the inside and outside pulleys 550 and 560 will not be horizontal except when the conveyor system is set up to make a 180° turn. At this point, the pulley shafts will be parallel with the horizontal line. At any other point, the shaft 570 will be at a slight angle to the horizontal as noted in FIGURE 5, the angle being shown as A.

It is obvious that any drive means can be connected to operate the intermediate conveyors 300 and 400 in much the same manner as the conveyor systems shown in FIGURES 1 and 2.

Operation of Adjustable Type

The system of operation of the structure shown in FIGURES 4 through 5 is similar to the construction of FIGURES 1 and 2. The Y member 512 permits the intermediate conveyors 300 and 400 to be set at the desired angle of the incoming and outgoing conveyors 302 and 402 respectively. Adjustment of the pivoting journals 304, 306, 404 and 406 permits the conveyor belts of the intermediate conveyors 300 and 400 to merge without any dropoff whatsoever with the plane of the circular conveyor C'.

While the invention has been described, it will be understood that it is capable of further modifications and this application is intended to cover any variations, uses or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims. One such departure would be to mount one or more circular conveyors and their delivery and receiver conveyors as described in this specification in stacked relationship one upon the other to provide several conveyor lines in a limited amount of space.

Having thus described my invention what I claim is:

1. A transition conveyor system comprising a circular ring conveyor, a delivery conveyor, a receiver conveyor, said delivery and receiver conveyors each comprising a pair of spaced, parallel, coplanar, coextensive belts, the inside belt of each pair extending into the inside of the circular conveyor ring, the outside belt of each pair being outside the circular conveyor ring, said circular ring conveyor comprising an angular ring member having a substantially uniplanar continuous load bearing surface, and means for driving said circular, delivery and receiving conveyors.

2. A transition conveyor system as in claim 1 and wherein the plane of conveyance of said circular conveyor intersects the plane of conveyance of said delivery and receiver conveyors.

3. A transition conveyor system as in claim 1 and wherein the plane of conveyance of said circular conveyor intersects the plane of conveyance of said delivery and receiver conveyors, said circular conveyor being angularly adjustable with respect to said delivery and receiver conveyors.

4. A transition conveyor system as in claim 1 and wherein said delivery and receiver conveyors are angularly adjustable with respect to each other.

5. A transition conveyor system as in claim 1 and wherein the plane of conveyance of said circular conveyor intersects the plane of conveyance of said delivery and receiver conveyors, said circular conveyor being angularly adjustable with respect to said delivery and receiver conveyors, and said delivery and receiver conveyors being angularly adjustable with respect to each other.

6. A transition conveyor system as in claim 1 and wherein said delivery and receiver conveyors are pivotally adjustable about the axis of said circular conveyor.

7. A transition conveyor system as in claim 1 and wherein said delivery and receiver conveyors are pivotally adjustable about a horizontal and a vertical axis.

8. A transition conveyor system as in claim 1, and wherein said load bearing surface extends widthwise substantially between the belts of each cooperating pair.

9. A transition conveyor system as in claim 1, and wherein said load bearing surface is generally rigid, smooth and uninterrupted and slightly less in width than the distance between the belts of a cooperating pair.

10. A combination of transition conveyor systems comprising a plurality of concentric ring conveyors, a delivery and receiver conveyor for each of said ring conveyors, said delivery and receiver conveyors comprising a pair of spaced, parallel, coplanar, coextensive belts, the inside belt of each pair running and extending into the inside of its respective circular conveyor ring, the outside belt of each pair being outside its respective circular conveyor ring, and means for driving said circular, delivery and receiver conveyors.

11. A transition conveyor system as in claim 10 and wherein the plane of conveyance of each of said circular conveyors, intersects the plane of conveyance of its respective delivery and receiver conveyors.

12. A transition conveyor system as in claim 10 and wherein the plane of conveyance of a circular conveyor intersects the plane of conveyance of its respective delivery and receiver conveyor, said circular conveyors being angularly adjustable with respect to their respective delivery and receiver conveyors.

13. A transition conveyor system as in claim 10 and wherein said delivery conveyors and their respective receiver conveyors, are angularly adjustable with respect to each other.

14. A transition conveyor system as in claim 10 and wherein the plane of conveyance of a circular conveyor intersects the plane of conveyance of its respective delivery and receiver conveyor, said circular conveyors being angularly adjustable with respect to their respective delivery and receiver conveyors, and each of said delivery conveyors being angularly adjustable with respect to its receiver conveyor.

15. A transition conveyor system as in claim 10 and wherein said delivery and receiver conveyors are pivotally adjustable about the axis of its respective circular conveyor.

16. A transition conveyor system as in claim 10 and wherein said delivery and receiver conveyors are pivotally adjustable about a horizontal axis.

17. A transition conveyor system as in claim 10 and wherein said delivery and receiver conveyors are pivoted about a horizontal and a vertical axis.

18. A transition conveyor system as in claim 10 and wherein said circular conveyors and their respective delivering and receiver conveyors, are driven in opposite directions.

References Cited in the file of this patent

UNITED STATES PATENTS

| | | |
|---|---|---|
| 1,475,962 | Olson | Dec. 4, 1923 |
| 2,580,054 | Vincent | Dec. 25, 1951 |

FOREIGN PATENTS

| | | |
|---|---|---|
| 315,205 | Germany | Oct. 27, 1919 |